WILLIAM POTTS, OF HANDSWORTH, ENGLAND.

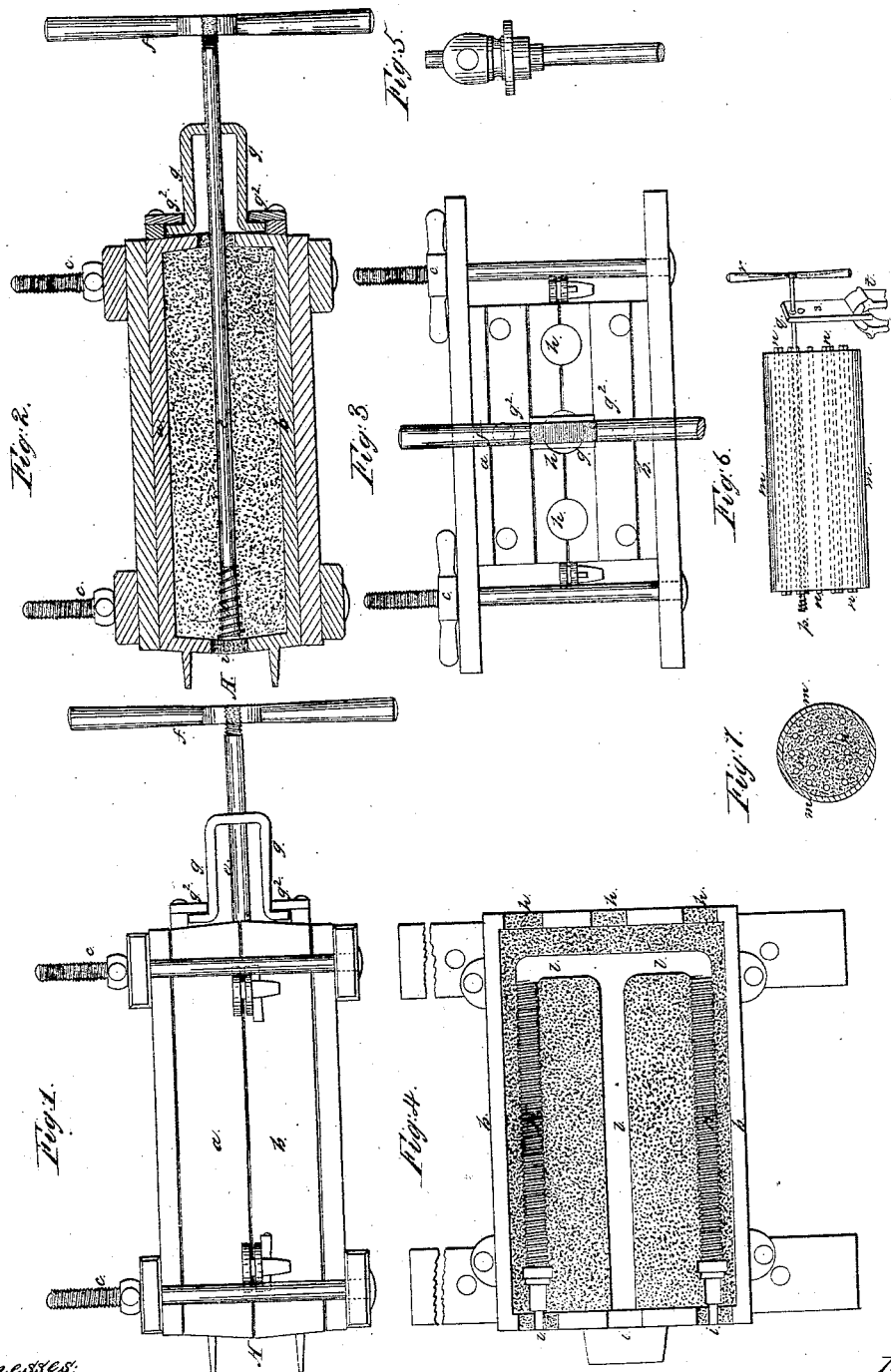

Letters Patent No. 83,791, dated November 3, 1868.

IMPROVEMENT IN MOULDING SCREWS.

The Schedule referred to in these Letters Patent and making part of the same.

*To all to whom it may concern:*

Be it known that I, WILLIAM POTTS, of Handsworth, in the county of Stafford, England, a subject of the Queen of Great Britain, have invented or discovered new and useful "Improvements in Making Moulds for the Manufacture of Metallic Screws;" and I, the said WILLIAM POTTS, do hereby declare the nature of the said invention, and in what manner the same is to be performed, to be particularly described and ascertained in and by the following statement thereof; that is to say—

The metallic screws of copying-presses, hydraulic presses and machinery, and of other articles, are ordinarily made from a rod of metal by means of a lathe or other screw-cutting machine. My invention consists in manufacturing the said screws by casting them in moulds, made in the manner and by the use of the apparatus hereinafter described, whereby great economy and facility of production are secured.

In making a mould for the manufacture of metallic screws according to my invention, I proceed as follows:

I produce, in the ordinary way and by the use of the ordinary apparatus and materials, a plain cylindrical mould, of the length of, but somewhat less in diameter than, the screw to be cast, with the usual and necessary jets and air-passages. I take a metallic pattern-screw having a taper figure. To the fore end of the pattern-screw, a guide-rod, with a handle, is affixed, by which said handle the pattern-screw may be turned.

At the end of the mould-boxes in which the cylindrical mould is made, an adjustable bearing is so arranged as to be capable of being brought successively into a line with each of a series of moulds, where a series is employed. In this bearing, the guide-rod and pattern-screw hereinbefore described can work; or, if preferred, the pattern-screw may be furnished with a guide-rod, both at its fore and at its rear end, each rod working in a bearing.

After the cylindrical mould has been formed, I pass the guide-rod at the taper end of the screw through the axis of the mould in the mould-boxes, until the fore end of the said rod is situated in the bearing described on the mould-boxes. When the guide-rod is in this position, the pattern-screw is situated in the rear end of the cylindrical mould. By now giving rotation to the pattern-screw, by means of the handle on the guide-rod, the said screw is made to screw through the cylindrical mould, (the conical end of the screw first advancing,) and to form or mould the threads of the screw in the interior of the cylindrical mould. A mould suitable for casting a screw is thereby produced. As the pattern-screw advances in the cylindrical mould, its rectilinear direction through the axis of the said mould is preserved by means of the guide-rod or rods and the bearing or bearings in which the said guide-rod or rods works or work.

The pattern-screw is now removed from the mould, which is then dried. When it is dry, the lower portion of each screw-mould is closed with loam, and the mould is then ready to receive the molten metal.

When tubular screws are required to be cast, the mould is cored in the usual way.

I prefer to cast the screws of malleable iron or Bessemer steel, but other hard metal or alloy may be used.

Having explained the nature of my invention, I will proceed to describe, with reference to the accompanying drawing, the manner in which the same is to be performed.

Figure 1 represents, in side elevation, the mould-boxes and apparatus which I use in making the mould for the casting of two or more metallic screws.

Figure 2 is a longitudinal vertical section of the same;

Figure 3 is an end elevation of the same; and

Figure 4 is a plan of the lower half of the mould, the upper half being removed.

The same letters of reference indicate the same parts in each figure of the drawing.

$a\ b$ are the mould-boxes or half-moulds, clamped together by the screw-clamps $c\ c$.

$d$ is the pattern-screw, having a taper figure, the said pattern-screw being fixed on the end of the guide-rod $e$. The said guide-rod $e$ is provided with a removable handle, $f$.

To one end of the mould-boxes $a\ b$, a bearing, $g$, is applied, the said bearing being situated in a line with the mould to be made. In this bearing $g$ the guide-rod $e$ works, as represented in figs. 1 and 2. The bearing $g$ is capable of sliding on the end of the mould-boxes, and of being brought opposite either of the holes $h$. By the same sliding motion, it can also be readily removed altogether from the moulds, or connected therewith.

The manner in which the ends of the bearing $g$ engage in the slide $g^2$ on the moulds will be understood by an examination of figs. 1, 2, and 3.

In making moulds for the casting of two or more press-screws, I proceed as follows:

I take pattern-rods, of a diameter somewhat less than that of the screws to be cast, and I lay these rods in the half-mould boxes, each rod being in a line with the openings $h\ i$, and upon the said rods I form moulds by ramming sand in the half-mould boxes in the usual manner. The half-mould boxes are then clamped together in the manner represented, and plain cylindrical moulds are thereby formed. The bearing $g$ is now slidden opposite one of the holes, $h$, in the mould-boxes, and having removed the handle $f$ from the guide-rod $e$, I pass the said guide-rod from the end, A, through the cylindrical mould and into the bearing $g$, the pattern-screw occupying the position represented in fig. 2.

Having reconnected the handle $f$ to the guide-rod $e$ and pattern-screw $d$, I give a rotatory motion to the said rod and pattern-screw, and cause the said screw to screw through the cylindrical mould, and to form or mould the threads of a screw in the interior of the mould.

As the pattern-screw $d$ advances in the mould, its rectilinear direction through the axis of the mould is preserved by means of the guide-rod $e$ and bearing $g$, as will be understood by an examination of fig. 2.

When the pattern-screw $d$ has screwed through the cylindrical mould and been brought into the bearing $g$, the said bearing is, by a sliding motion, detached from the mould-boxes.

The handle $f$ is removed and the screw $d$ and guide-rod $e$ are removed from the bearing, and the said bearing is reconnected with the mould-boxes, and brought opposite another cylindrical mould, when the operations described are repeated, and another screw-mould is formed.

The jets for the passage of the molten metal and the vents for the escape of the gases are made in the half moulds during the moulding of the first or cylindrical moulds.

After the screw-moulds have been dried, the lower portion of each screw-mould is closed by loam, when the moulds are ready to receive the molten metal, the casting-process being conducted in the ordinary way.

In fig. 4, two screw-moulds, $k$ $k$, are made in the mould-boxes, the jets for the passage of the molten metal being marked $l$.

When tubular screws are to be cast, the screw-mould is cored in the usual manner.

Figure 5 represents the head of a pattern-rod which I use to form the first or cylindrical mould when vise-screws are required to be cast.

Instead of making the screw-moulds in ordinary mould-boxes, as described and represented, the screw-moulds may be made in a mould-box of a hollow cylindrical form, and the bearing for supporting the guide-rod may be fixed in a vise during the rotatory motion of the pattern-screw.

This arrangement of my invention is illustrated in elevation in Figure 6 and cross-section in Figure 7 of the drawing.

In the said figs. 6 and 7, $m$ is the hollow cylindrical mould-box; $n$, the pattern-rods, to form the cylindrical moulds. $p$ is the pattern-screw, $q$, the guide-rod, and $r$ the handle for turning it and the pattern-screw. $s$ is the bearing for supporting the guide-rod $q$, fixed at the required height in the jaws, $t$, of a vise.

The hollow cylindrical mould-box $m$ is supported on any convenient framing. After the rods $m$ have been withdrawn, the screw-threads are made in the cylindrical moulds, in the manner described with respect to figs. 1, 2, 3, and 4.

The last-described arrangement permits a large number of screw-moulds to be formed in the same mould-box.

Although I find one guide-rod and one bearing sufficient to preserve the rectilinear direction of the pattern-screw, yet, if desirable, a bearing may be placed on either end of the mould-boxes, and a guide-rod be situated on either end of the pattern-screw.

Having now described the nature of my invention, and the manner in which the same is to be performed, I would state that I am aware that various methods of forming moulds for seamless screws, by means of a pattern-screw, have been heretofore employed. The method I pursue, however, differs essentially from those referred to, as I first form a plain cylindrical mould, and then produce, by a subsequent operation, the thread in such mould, as hereinbefore explained. I wish it to be understood, also, that I do not limit myself to the precise details herein described and illustrated, as the same may be varied without departing from the nature of my invention; but

What I claim, and desire to secure by Letters Patent, is:—

The method of producing moulds for casting screws, by first making a plain cylindrical mould, and afterward moulding the thread by screwing a pattern-screw through the said cylindrical mould, substantially in the manner and by the means herein shown and set forth.

WILLIAM POTTS. [L. S.]

Witnesses:
   GEORGE SHAW,
      7 Cannon Street, Birmingham.
   RICHARD SKERRETT,
      7 Cannon Street, Birmingham.